United States Patent
Ito

(10) Patent No.: US 8,621,370 B2
(45) Date of Patent: Dec. 31, 2013

(54) BATCH PROCESSING INFORMATION PROCESSING INCLUDING SIMULTANEOUSLY MOVING A PLURALITY OF OBJECTS AND INDEPENDENTLY MOVING AN OBJECT FROM THE REST OF THE PLURALITY OF OBJECTS

(75) Inventor: Hikaru Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 791 days.

(21) Appl. No.: 12/581,745

(22) Filed: Oct. 19, 2009

(65) Prior Publication Data

US 2010/0100882 A1 Apr. 22, 2010

(30) Foreign Application Priority Data

Oct. 21, 2008 (JP) .................................. 2008-271382

(51) Int. Cl.
*G06F 3/0484* (2013.01)

(52) U.S. Cl.
USPC ............................ 715/760; 715/255; 715/272

(58) Field of Classification Search
USPC ......................................................... 715/760
See application file for complete search history.

(56) References Cited

U.S. PATENT DOCUMENTS

| 7,454,702 B2* | 11/2008 | Simmons et al. ............. 715/272 |
| 2006/0267967 A1* | 11/2006 | Hinckley et al. .............. 345/179 |
| 2008/0170752 A1 | 7/2008 | Murayama |
| 2009/0193351 A1* | 7/2009 | Lee et al. ....................... 715/769 |

FOREIGN PATENT DOCUMENTS

JP 2006-244353 A 9/2006

OTHER PUBLICATIONS

"Group or ungroup shapes", Microsoft Visio 2007 help topic, includes one page, accessed at "http://office.microsoft.com/en-us/visio-help/group-or-ungroup-shapes-HP001231305.aspx" on Nov. 16, 2012.

* cited by examiner

*Primary Examiner* — Doug Hutton, Jr.
*Assistant Examiner* — Ashley Fortino
(74) *Attorney, Agent, or Firm* — Canon U.S.A., Inc. IP Division

(57) ABSTRACT

When a plurality of objects are subjected to a batch processing by an object selection unit and a batch processing execution unit, if an input is made to an object included in the plurality of objects, an information processing apparatus controls the processing execution unit so as to execute a processing on the object based on the input, thereby executing a processing of moving all of the selected plurality of objects simultaneously with a processing of moving an arbitrary object separately from other objects among the selected plurality of objects.

7 Claims, 7 Drawing Sheets

BATCH PROCESSING INFORMATION PROCESSING INCLUDING SIMULTANEOUSLY MOVING A PLURALITY OF OBJECTS AND INDEPENDENTLY MOVING AN OBJECT FROM THE REST OF THE PLURALITY OF OBJECTS

BACKGROUND OF THE INVENTION

1. Field of the Invention

The present invention relates to an information processing apparatus and a control method thereof.

2. Description of the Related Art

The conventional object drawing tool is configured to move an object displayed on a display screen of a computer by using a pointing device such as a mouse. In such an object drawing tool, a cursor is displayed on a screen of the computer and a user can move the cursor by using the pointing device.

The object drawing tool can select an object at a position where the cursor is displayed by clicking a button provided on the pointing device. Further, the object drawing tool can select a plurality of objects by repeatedly clicking the button while a predetermined key of a keyboard is pressed.

Japanese Patent Laid-open Publication No. 2006-244353 discusses a technique in that a user can move an object at a position where a cursor is displayed by moving the cursor while a user presses and holds a button. According to Japanese Patent Laid-open Publication No. 2006-244353, when the user selects a plurality of objects, the user can move the plurality of objects at once by pointing any object among the plurality of selected objects with the cursor and moving the cursor while the user presses and holds the button.

In other words, by an instruction of a user to move the cursor along a limited path on the display screen, an image is selected according to the cursor path and the selected image is moved to an end point of the cursor path.

However, in the above described conventional technique, when a user selects a plurality of objects, it is not possible for the user to move all the plurality of selected objects and to move an arbitrary object among the plurality of selected objects independently at the same time.

SUMMARY OF THE INVENTION

The present invention is directed to an information processing apparatus capable of simultaneously performing processing for moving a plurality of selected objects together and processing for moving an arbitrary object separately from other objects among the plurality of selected objects, and a control method thereof.

According to an aspect of the present invention, an information processing apparatus includes a processing execution unit configured to execute processing on objects based on an input made with respect to the object displayed on a display device, an object selection unit configured to select more than one of the objects displayed on the display device, a batch processing execution unit configured to execute batch processing on the plurality of objects selected by the object selection unit, and a control unit configured to, if an input is made with respect to an object included in the plurality of objects when the plurality of objects are subjected to the batch processing by the batch processing execution unit, control the processing execution unit to execute the processing with respect to the objects to which the input was made.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
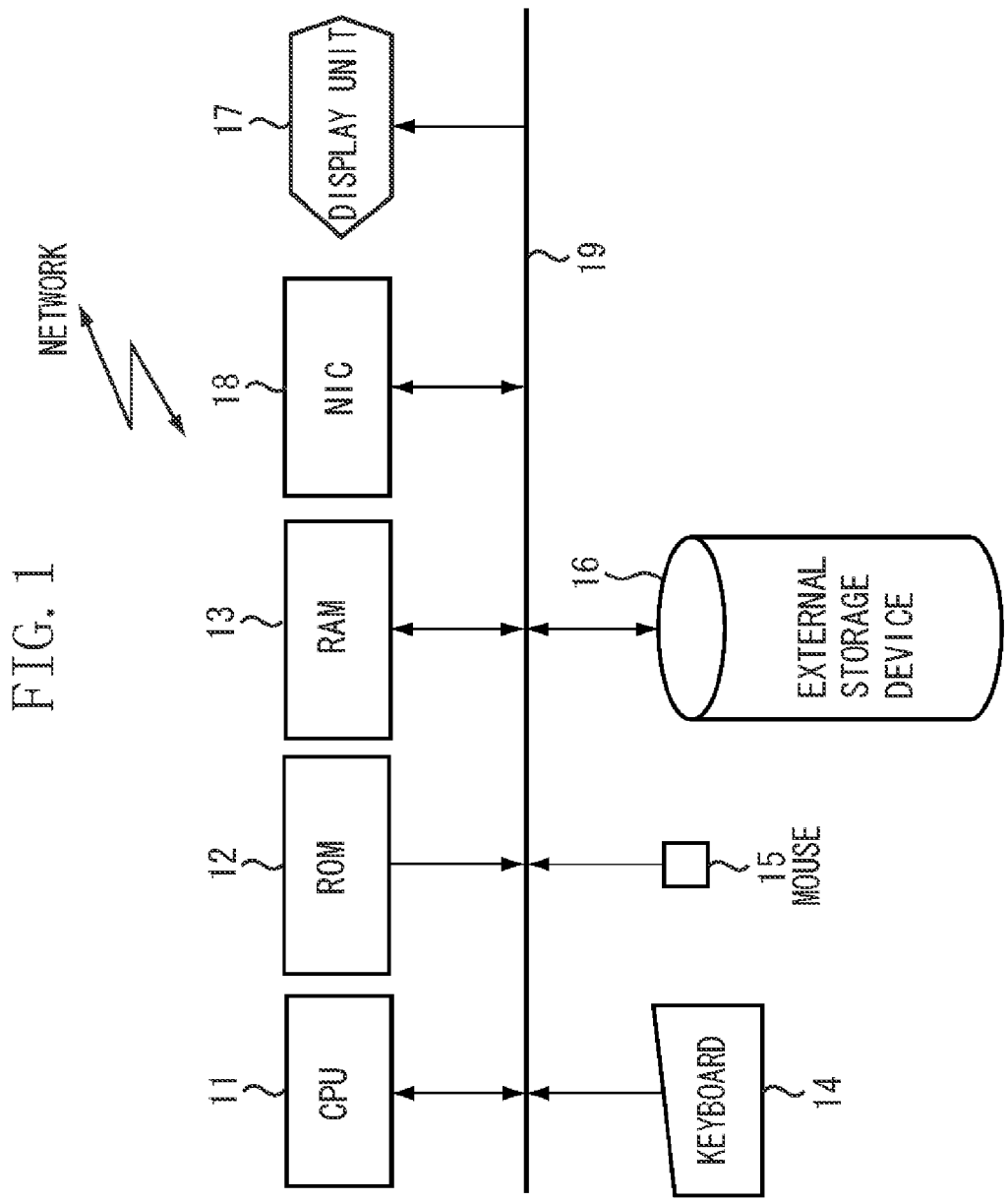
FIG. 1 is a block diagram illustrating an example of a hardware configuration of an information processing apparatus (e.g., computer).

FIG. 1 is a block diagram illustrating an example of a hardware configuration of an information processing apparatus (e.g., computer).

In FIG. 1, a central processing unit (CPU) 11 executes various controls of the information processing apparatus. A read-only memory (ROM) 12 stores a boot program, which is executed when starting up the information processing apparatus, and various data. A random access memory (RAM) 13 stores a control program executed by the CPU 11 as well as provides a work area when the CPU 11 executes the various controls. A keyboard 14 and a mouse 15 provide a user with various input operation environments.

An external storage device 16 includes a hard disk, an optical disk, a magnetic disk, an optical magnetic disk, a magnetic tape, and so on. However, if the ROM 12 stores all of the control programs and the various data, the external storage device 16 is not necessarily required.

A display unit 17 includes a display in order to display a processing result or the like for the user. A network interface (NIC) 18 enables communications with the other devices on network through a LAN cable or the like. Further, a bus 19 connects the above described elements to each other.

By executing processing by the CPU 11 based on the program stored in the ROM 12 or the external storage device 16, functions of the information processing apparatus and/or individual processing of a flow chart, which will be described later, can be realized.

Figure 2:
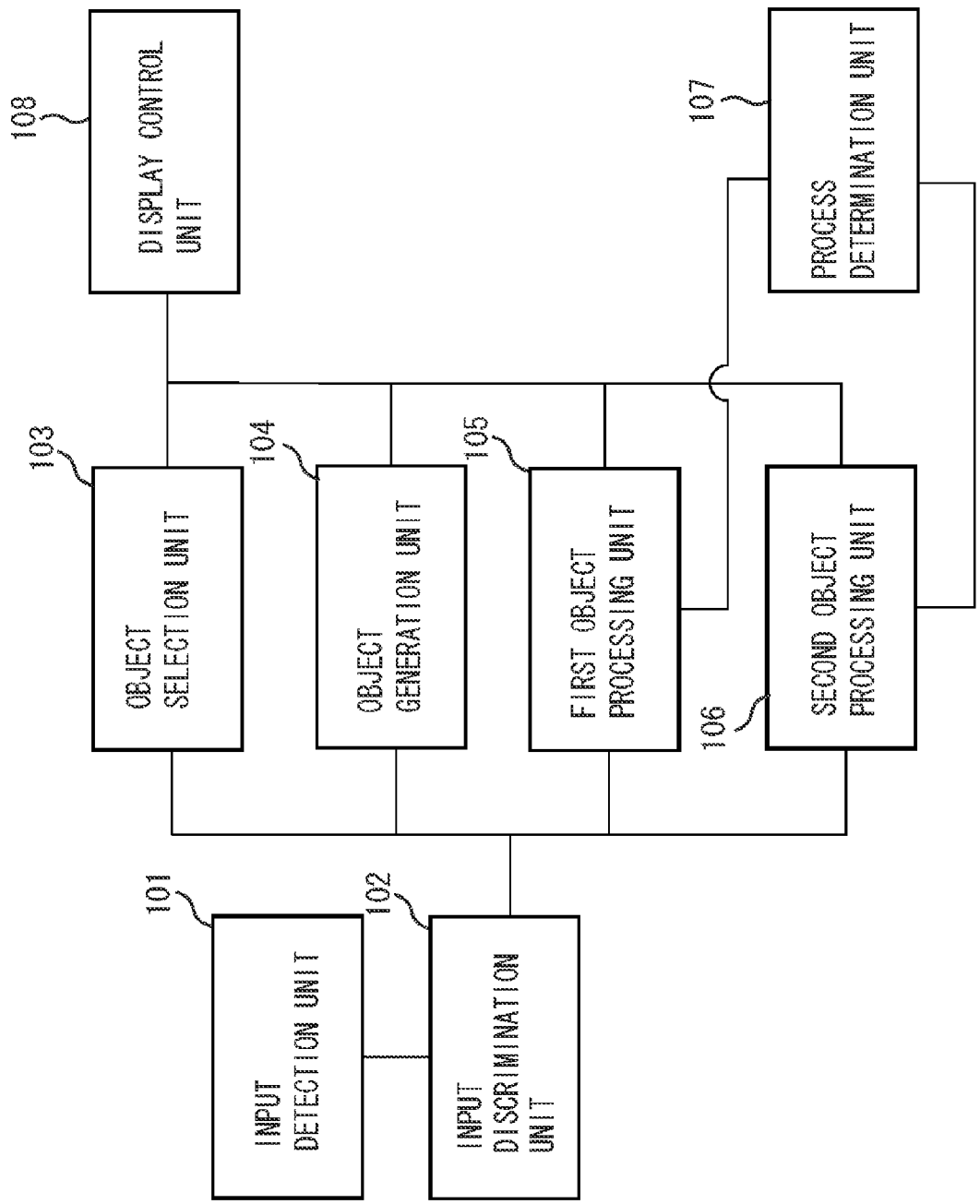
FIG. 2 is a block diagram illustrating an example of a functional configuration of the information processing apparatus.

FIG. 2 is a block diagram illustrating an example of a functional configuration of the information processing apparatus.

An input detection unit 101 detects an input made on a display screen. An input discrimination unit 102 discriminates to which objects on the display screen the input detected by the input detection unit 101 is directed, or which positional coordinates on the display screen the input detected by the input detection unit 101 indicates.

An object selection unit 103 selects one or a plurality of objects on the display screen based on the input detected by the input detection unit 101 and discriminated by the input discrimination unit 102. More specifically, the object selection unit 103 designates an arbitrary area on the display screen and selects an object within the area.

Further, the object selection unit 103 highlights the object in selection. More specifically, the object selection unit 103 changes a color and clarity of the object in selection and a line of the object in selection into a bold line.

An object generation unit 104 generates a batch processing input object in order to make a plurality of objects to be a batch processing target when the object selection unit 103 selects the plurality of objects.

The object generation unit 104 associates the plurality of objects selected by the object selection unit 103 with the generated batch processing input object, and holds the association information of the association. The shape of the batch processing input object encircles the selected objects. More specifically, the batch processing input object is configured to include the selected objects therein.

Generation of the batch processing input object as described above enables the user to recognize a relationship between the batch processing input object and the selected objects with ease.

Further, it is not necessarily required to generate the batch processing input object. If the batch processing input object is not created, for example, all of the objects displayed on the display screen may be designated as a target of the batch processing, or an input into an area where no objects are displayed on the display screen may be used as an input area for the batch processing.

A first object processing unit 105 processes the objects selected by the object selection unit 103 based on the input detected by the input detection unit 101 and discriminated by the input discrimination unit 102.

A second object processing unit 106 executes the batch processing with respect to the plurality of objects (a group of objects) that are in association with the batch processing input object based on the input for the batch processing input object detected by the input detection unit 101 and discriminated by the input discrimination unit 102.

A process determination unit 107 controls the first object processing unit 105 to execute the processing for the objects based on the input when the input is made with respect to an arbitrary object included in the plurality of objects while the processing (batch processing) for the plurality of objects is executed in the second object processing unit 106.

A display control unit 108 displays an object or the like on the display screen (i.e., display unit 17).

Figure 3:
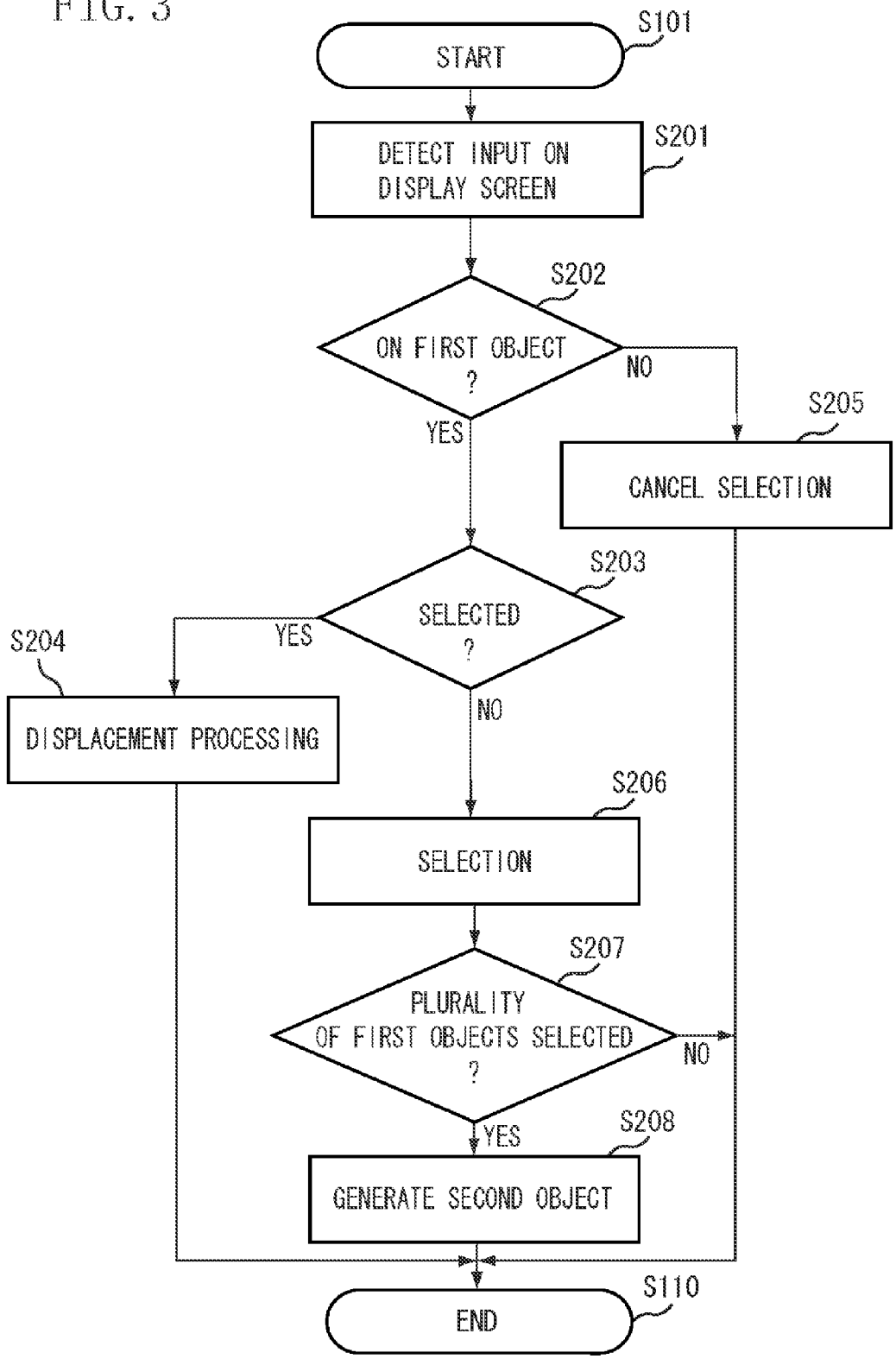
FIG. 3 is a flow chart illustrating an example of an object selection processing.

FIG. 3 is a flow chart illustrating an example of an object selection processing.

The object selection processing refers to processing performed for placing the object to be processed into a selected condition. The selection is made in order to perform some processing, for example, to any of the selected first objects 401 through 405 displayed on the display screen of FIG. 4. In the present exemplary embodiment, the processing is a displacement processing.

FIG. 4 illustrates an example of objects displayed on the display screen.

In step S201, the input detection unit 101 and the input discrimination unit 102 detect an input made by the user on the display screen.

In step S202, for example, the object selection unit 103 determines whether or not a position designated by the input of the user is on the first objects displayed on the display screen based on the input detected by the input detection unit 101 and discriminated by the input discrimination unit 102.

The processing proceeds to step S203 if the object selection unit 103 determines that the position designated by the input of the user is on the first objects displayed on the display screen (YES in step S202). On the other hand, the processing proceeds to step S205 if the object selection unit 103 determines that the position designated by the input of the user is not on the first objects displayed on the display screen (NO in step S202).

In step S203, for example, the object selection unit 103 determines whether or not the first objects 401 through 405 designated by the user are selected. The processing proceeds to step S204 if the object selection unit 103 determines that the first objects 401 through 405 designated by the user are selected (YES in step S203). On the other hand, the step proceeds to step S206 if the object selection unit 103 determines that the first objects 401 through 405 designated by the user are not selected (NO in step S203).

In step S204, the first object processing unit 105 displaces the first objects 401 through 405 to a position the user designates.

In step S205, the object selection unit 103 cancels the selection state of the first objects 401 through 405, which are in a selected condition on the display screen.

On the other hand, in step S206, the object selection unit 103 places the first objects 401 through 405 into the selected condition on the display screen.

In step S207, the object selection unit 103 determines whether or not there are a plurality of selected objects on the display screen. The processing proceeds to step S208 if the object selection unit 103 determines that there are the plurality of objects selected on the display screen (YES in step S207). The processing of FIG. 3 is ended if the object selection unit 103 determines that not a plurality of objects are selected on the display screen (NO in step S207).

In step S208, the object generation unit 104 newly generates a second object (batch processing input object) 400 displayed on the display screen (i.e., batch processing input object generation).

Figure 5:
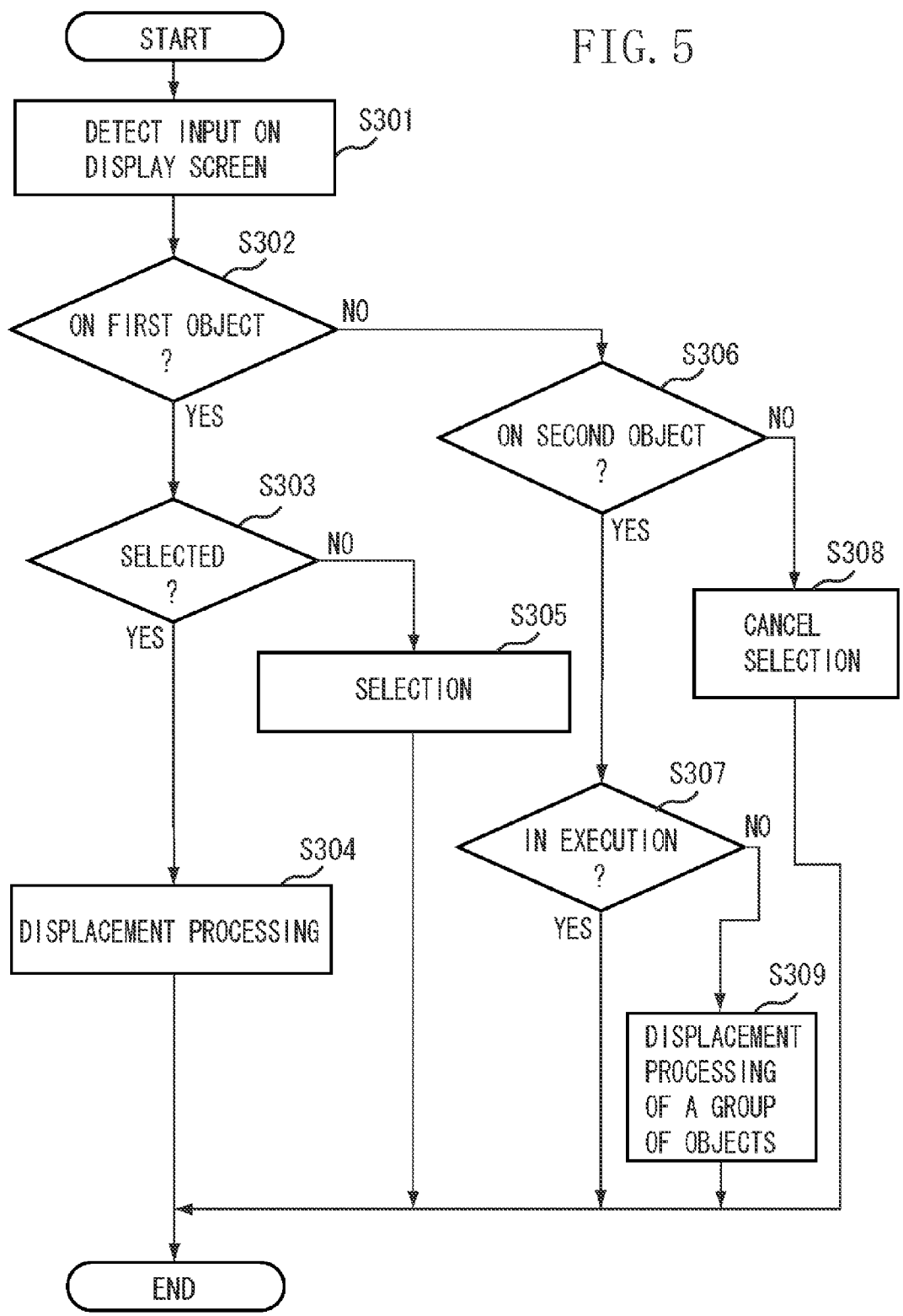
FIG. 5 is a flow chart illustrating an example of an object displacement processing.

FIG. 5 is a flow chart illustrating an example of the object displacement processing. The object displacement processing illustrated in FIG. 5 is started after the plurality of first objects 401 through 405 and the second object 400 in a selected condition are displayed on the display screen according to the above described object selection processing.

In step S301, the input detection unit 101 and the input discrimination unit 102 detect an input of the user on the display screen.

In step S302, for example, the object selection unit 103 determines whether or not a position designated by the input of the user is on the first objects displayed on the display screen based on the input detected by the input detection unit 101 and discriminated by the input discrimination unit 102.

The processing proceeds to step S303 if the object selection unit 103 determines that the position designated by the input of the user is on the first objects displayed on the display screen (YES in step S302). On the other hand, the processing proceeds to step S306 if the object selection unit 103 determines that the position designated by the input of the user is not on the first objects displayed on the display screen (NO in step S302).

In step S303, for example, the object selection unit 103 determines whether or not the first objects 401 through 405 designated by the user are selected.

The processing proceeds to step S304 if the object selection unit 103 determines that the first objects 401 through 405 designated by the user are selected (YES in step S303). On the other hand, the processing proceeds to step S305 if the object selection unit 103 determines that the first objects 401 through 405 designated by the user are not selected (NO in step S303).

In step S304, the process determination unit 107 controls the first object processing unit 105 to execute a processing for any one of the first objects (for example, the first object 403) designated by the user among the first objects 401 through 405.

The above-described processing is, for example, the one for displacing the selected object to a position designated by the user (displacement processing). In the present exemplary embodiment, the displacement processing is exemplified. However, the processing may be any one of a rotation processing, an enlargement processing, a reduction processing, a modification processing, or the like.

In step S305, the object selection unit 103 places the first objects 401 through 405 in the selected condition.

In step S306, for example, the object selection unit 103 determines whether or not the position designated by the input of the user is on the second object displayed on the display screen based on the input detected by the input detection unit 101 and discriminated by the input discrimination unit 102.

The processing proceeds to step S307 if the object selection unit 103 determines that the position designated by the input of the user is on the second object displayed on the display screen (YES in step S306). On the other hand, the processing proceeds to step S308 if the object selection unit 103 determines that the position designated by the input of the user is not on the second object displayed on the display screen (NO in step S306).

In step S307, the second object processing unit 105 determines whether or not the object (a group of objects) in selection is now subjected to the displacement processing.

The processing of FIG. 5 is ended if the second object processing unit 105 determines that the object (a group of objects) in selection is now subjected to the displacement processing (YES in step S307). On the other hand, the processing proceeds to step S309 if the second object processing unit 105 determines that the object (group of objects) in selection is not subjected to the displacement processing now (NO in step S307).

In step S308, the object selection unit 103 cancels selection of the object (a group of objects) in selection on the display screen.

In step S309, the second object processing unit 105 performs the displacement processing (processing to displace the object to the position designated by the user) on the object (a group of objects) in selection (i.e., execution of the batch processing). In the present exemplary embodiment, the displacement processing is exemplified, however, the processing may be any one of the rotation processing, the enlargement processing, the reduction processing, the modification processing, or the like.

An operation of objects will be described below with reference to FIG. 4. On the display screen of FIG. 4A, the plurality of first objects 401 through 405 are selected and displayed. The first objects 401 through 405 are formed into square shapes. The second object is displayed around the selected first objects 401 through 405. The second object is formed into a circle shape and an inside of the second object is hatched.

Figure 4C:
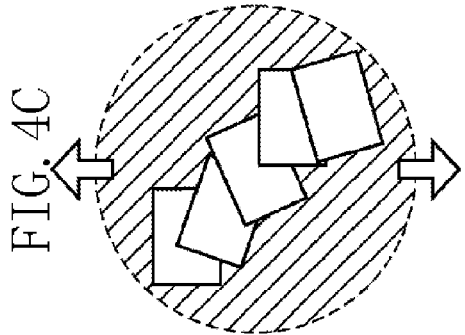
FIGS. 4A through 4E illustrate examples of objects displayed on display screens, respectively.
Figure 4B:
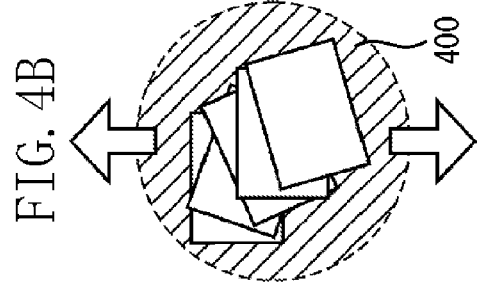

The user designates two points on the second object of FIG. 4B. The user moves one of the designated points upward, whereas the other one of the designated points downward. As a result thereof, as illustrated in FIG. 4C, positions of the first objects 401 through 405 (first objects 401 through 405) are displaced and expanded, respectively, in an up-and-down direction.

Now, two points are input by the user. The distance between an input point and the position of the object is reflected on the processing to be performed. The shorter the distance is, the more the input information is reflected on the processing to be performed, whereas the longer the distance is, the less the input information is reflected on the processing to be performed.

More specifically, the object 401 is positioned nearer to the input of the upper side. The input of the upper side has a vector in an upper direction on the display screen. Therefore, the object 401 moves upwardly on the display screen. Similarly, the object 402 also moves upward on the display screen. Since the distance from the input point of the object 402 is longer than that of the object 401, the displacement distance of the object 402 is shorter than that of the object 401.

Since the object 403 is positioned in a middle of the two input points, i.e., between the input point of the upper side and the input point of the lower side, the upward vector and the downward vector, i.e., two information inputs, are balanced. As a result, the object 403 would not move.

The object 404 and the object 405 move downward on the display screen. A displacement distance of the object 405 is longer than that of the object 404.

The existence of an overlapped portion between selected objects on the display screen is detected. Based on the detection result, the objects in selection are subjected to the enlargement processing.

Even when the user input similar to that described above is continued, the processing may be changed to an object display rate enlargement processing when the objects has become not overlapped state with each other any more.

Figure 4E:
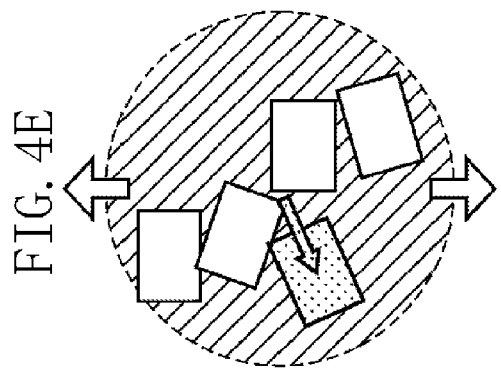
Figure 4A:
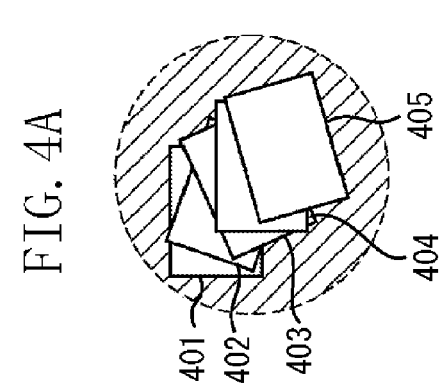
Figure 4D:
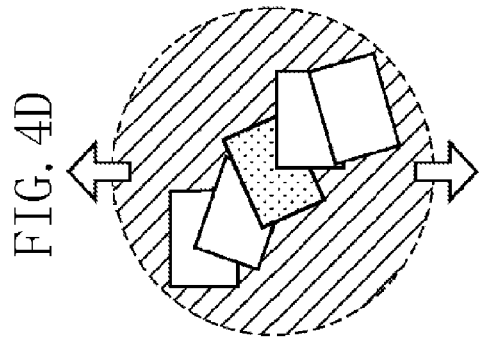

As illustrated in FIG. 4D, the user continues to spread the first objects 401 through 405 in the up-and-down direction and, at the same time, designates, for example, one of the first objects (e.g., first object 403) among the first objects 401 through 405 in selection.

As illustrated in FIG. 4E, when the user moves a designated position obliquely downward, only the designated first object 403 moves obliquely downward and the other first objects 401, 402, 404, and 405 are spread in the up-and-down direction based on the processing of the above described up-and-down spreading processing.

According to the configuration and processing of the present exemplary embodiment, as is illustrated in FIG. 4, the user can move only the designated first object 403 obliquely downward and, at the same time, perform a processing with respect to the other first objects 401, 402, 404, and 405 (i.e., processing of spreading the other first objects in the up-and-down direction as is exemplified in FIG. 4).

In other words, according to the present exemplary embodiment, the user can perform the processing of moving all the plurality of objects 401, 402, 404, and 405 simultaneously with the processing of independently moving the arbitrary object 403 among the plurality of selected objects 401 through 405.

Figure 6:
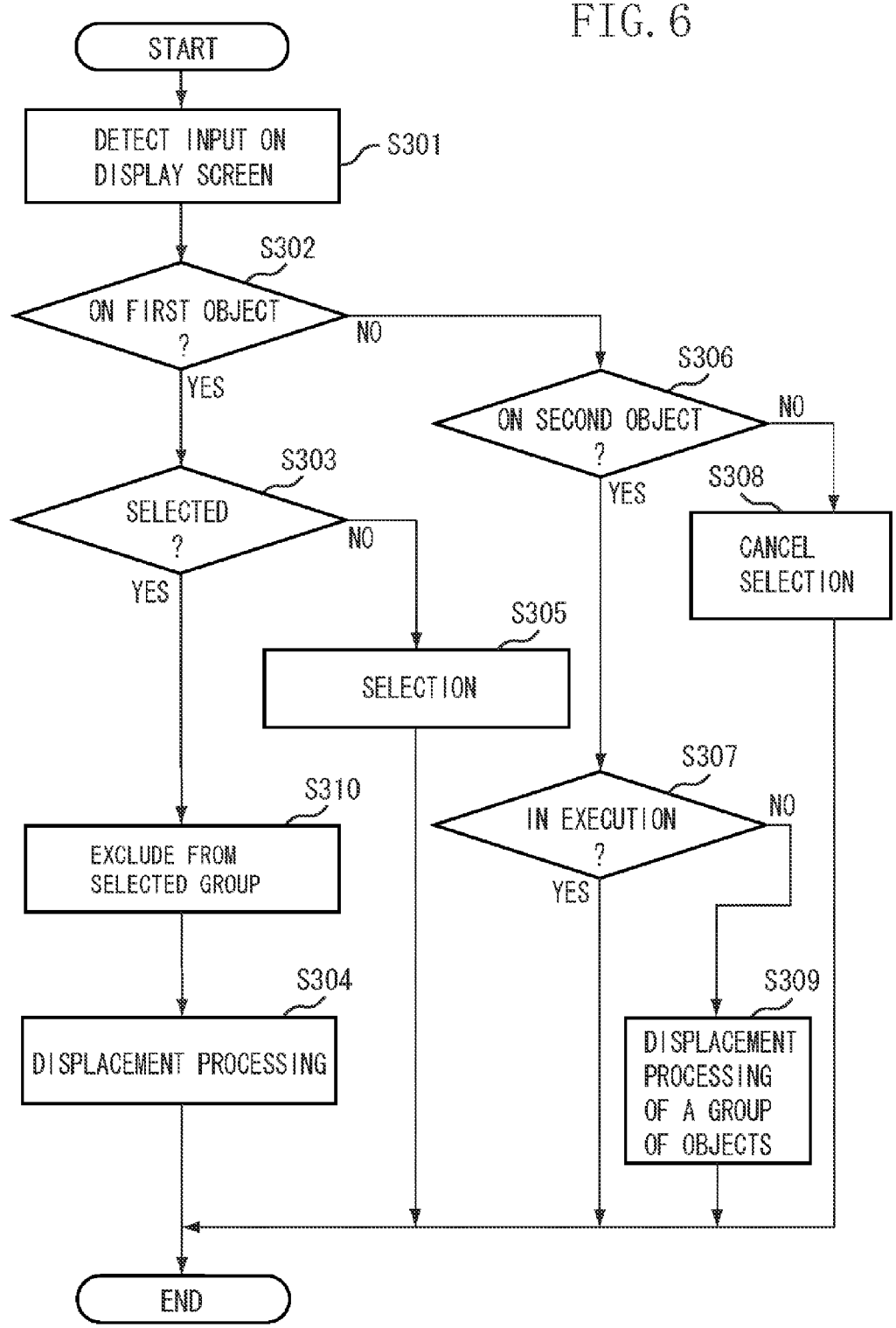
FIG. 6 is a flow chart illustrating another example of the object displacement processing.

In the present exemplary embodiment, when the designated arbitrary object among the plurality of selected objects 401 through 405 is independently displaced, the processing is performed on the selected group excluding the object to be processed independently (for example, the first object 403 of FIG. 4) from the selected group. FIG. 6 is a flow chart illustrating an example of the object displacement processing. Explanation will be omitted by providing similar numerical numbers to the processing similar to the above described processing of FIG. 5.

In step S310, the process determination unit 107 excludes the first object designated by the user (for example, the first object 403) among the first objects 401 through 405 from the batch processing.

A timing at which the process determination unit 107 excludes the first object designated by the user is a time at which the object, which is subjected to the processing independently, is positioned outside the batch processing input object. With the above described control, the user can recognize the timing at which the designated object is excluded from the batch processing with ease.

A new object may be selected to add to the batch processing target. The newly selected object can be subjected to the batch processing by moving the newly selected object inside the batch processing input object.

The adding timing may be a timing at which the newly selected object has been moved in the batch processing input object. With the above described control, the user can recognize the timing at which the object has been added to the batch processing target with ease.

When the newly selected object is added to the batch processing target, a display condition of the newly selected object is matched with that of the batch processing target. The display condition includes an enlargement rate, a display rotation angle, a distance between displayed positions, or the like.

In other words, if the batch processing target is displayed with a magnification ratio of 200%, the object to be newly added is to be displayed with the magnification of 200%. With the above described control, it is not necessary for the user to adjust the display condition of the newly added object, so that the user's working efficiency can be improved.

When the processing of step S310 is executed, the object (for example, the first object 403) is subjected to the independent processing. As a result, the object is excluded from the selected group, and the object is not a target of the processing for the entire selected group after the independent processing is executed. After the execution of the independent processing, the object having been subjected to the independent processing may be returned to the batch processing target again.

According to the present exemplary embodiment, the processing in which an arbitrary object, which is excluded from the selected group, is independently moved can be executed, without the processing of canceling the selection of the entire group of objects. Accordingly, the operation of the user can be simplified.

In the present exemplary embodiment, a case where there are the plurality of second objects (batch processing input objects) 400 is exemplified.

The object generation unit 104 associates the plurality of objects selected by the object selection unit 103 (first objects 401 through 405) with the batch processing input object (second object 400) relating to the batch-processing for the plurality of objects. The object generation unit 104 holds (stores in the RAM 13, the external storage device 16, or the like) association information relating to the above described association.

Figure 7:
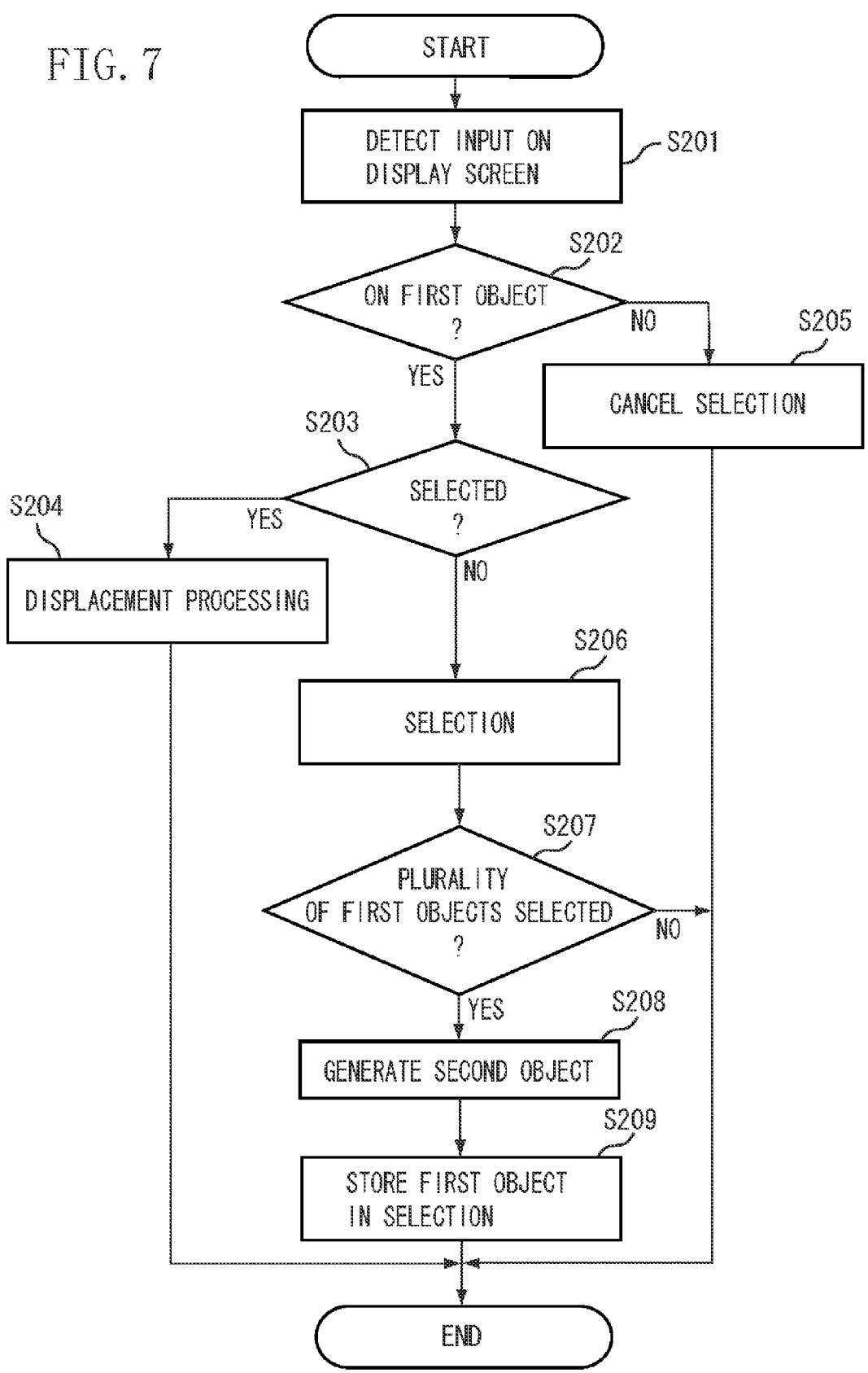
FIG. 7 is a flow chart illustrating an example of an object selection processing.

FIG. 7 is a flow chart illustrating an example of the object selection processing. Processing similar to that of FIG. 3 is denoted by the same reference numbers and descriptions thereof are omitted.

In step S209, the object generation unit 104 associates the batch processing input object with the plurality of objects relating to the batch processing input object when or after the object generation unit 104 generates the batch processing input object. The object generation unit 104 holds association information relating to the above association.

In other words, the object generation unit 104 holds association information indicating that the plurality of the first objects 401 through 405 in selection are members of the group and the second object 400 is a symbol of the group. According to the present exemplary embodiment, a plurality of selected groups can be handled.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-271382 filed Oct. 21, 2008, which is hereby incorporated by reference herein in its entirety.

What is claimed is:

1. An information processing apparatus comprising:
   a processor;
   a display control unit configured to display, on a display screen, a batch processing input object having a boundary size and including a plurality of objects located at a position;
   a detection unit configured to detect an input point on the display screen;
   a batch processing execution unit configured to, in a case where the detection unit detects the input point on the batch processing input object at a position other than the position where the plurality of objects is located, move the plurality of objects included in the batch processing input object in accordance with movement of the input point;
   a processing execution unit configured to, in a case where the detection unit detects the input point on an object of the plurality of objects included in the batch processing input object, move the object independently from the rest of the plurality of objects in accordance with movement of the input point; and
   a determination unit configured to, when the object is moved independently from the rest of the plurality of objects, determine that the object is moved to outside of the batch processing input object, wherein, in a case where the determination unit determines that the object is moved to outside of the batch processing input object, the object is excluded from being a target of batch processing until at least after its independent processing, at which time the object is again eligible for batch processing.

2. The information processing apparatus according to claim 1,
wherein in a case where an object is introduced into the batch processing input object, the batch processing execution unit adds the introduced object to the plurality of objects included in the batch processing input object as a target of the batch processing.

3. The information processing apparatus according to claim 2, further comprising:
an object display condition storage unit configured to store a display condition of the plurality of objects included in the batch processing input object,
wherein the processing execution unit controls the object introduced into the batch processing input object to be displayed in the display status stored in the object display status storage unit.

4. The information processing apparatus according to claim 1,
wherein the display control unit associates each of the plurality of objects with the batch processing input object relating to the batch processing performed on the plurality of objects, and holds association information relating the association, and
wherein the batch processing execution unit specifies a plurality of objects which becomes a target of batch processing, based on the association information.

5. A method of processing objects, the method comprising:
displaying, on a display screen, a batch processing input object having a boundary size and including a plurality of objects located at a position;
detecting an input point on the display screen;
moving, in a case where the input point is detected on the batch processing input object at a position other than the position where the plurality of objects is located, the plurality of objects included in the batch processing input object in accordance with movement of the input point;
moving, in a case where the input point is detected on an object of the plurality of objects included in the batch processing input object, the object independently from the rest of the plurality of objects in accordance with movement of the input point; and
determining, when the object is moved independently from the rest of the plurality of objects, that the object is moved to outside of the batch processing input object,
wherein, in a case where it is determined that the object is moved out of the batch processing input object boundary, the object is excluded from being a target of batch processing until after its independent processing when the object is again available for batch processing.

6. A computer-readable non-transitory storage medium storing a program that when executed, causes a computer to:
display, on a display screen, a batch processing input object having a boundary size and including a plurality of objects located at a position;
detect an input point on the display screen;
move, in a case where the input point is detected on the batch processing input object at a position other than the position where the plurality of objects is located, the plurality of objects included in the batch processing input object in accordance with movement of the input point;
move, in a case where the input point is detected on an object of the plurality of objects included in the batch processing input object, the object independently from the rest of the plurality of objects in accordance with movement of the input point; and
determine, when the object is moved independently from the rest of the plurality of objects, that the object is moved to outside of the batch processing input object,
wherein, in a case where it is determined that the object is moved out of the batch processing input object boundary, the object is excluded from being a target of batch processing until at least after its independent processing when the object may be returned to the batch processing input object.

7. An information processing apparatus comprising:
a display screen;
a display control unit configured to display, on the display screen, a batch processing input object having a boundary size and including a plurality of objects located at a position;
a detection unit configured to detect an input point on the display screen;
a batch processing execution unit configured to, in a case where the detection unit detects the input point on the batch processing input object at a position other than the position where the plurality of objects is located, move the plurality of objects included in the batch processing input object in accordance with movement of the input point;
a processing execution unit configured to, in a case where the detection unit detects the input point on an object of the plurality of objects included in the batch processing input object, move the object independently from the rest of the plurality of objects in accordance with movement of the input point; and
a determination unit configured to, when the object is moved independently from the rest of the plurality of objects, determine that the object is moved to outside of the batch processing input object,
wherein, in a case where the determination unit determines that the object is moved to outside of the batch processing input object, the object is excluded from being a target of batch processing until at least after its independent processing, at which time the object is again eligible for batch processing.

* * * * *